United States Patent
Hottmann

(10) Patent No.: US 11,180,085 B2
(45) Date of Patent: Nov. 23, 2021

(54) EXTERIOR REARVIEW DEVICE WITH REMOVABLE HEAD AND VEHICLE INCLUDING SAME

(71) Applicant: SMR Patents S.à.r.l., Luxembourg (LU)

(72) Inventor: Philipp Hottmann, Remshalden (DE)

(73) Assignee: SMR Patents S.à.r.l., Luxembourg (LU)

(*) Notice: Subject to any disclaimer, the term of this patent is extended or adjusted under 35 U.S.C. 154(b) by 249 days.

(21) Appl. No.: 16/005,923

(22) Filed: Jun. 12, 2018

(65) Prior Publication Data

US 2018/0354422 A1    Dec. 13, 2018

(30) Foreign Application Priority Data

Jun. 12, 2017   (DE) .................. 10 2017 112 915.4

(51) Int. Cl.
| | | |
|---|---|---|
| *B60R 1/078* | (2006.01) | |
| *B60R 11/04* | (2006.01) | |
| *B60R 1/12* | (2006.01) | |
| *H04N 5/225* | (2006.01) | |

(52) U.S. Cl.
CPC ............ *B60R 1/078* (2013.01); *B60R 1/1207* (2013.01); *B60R 11/04* (2013.01); *H04N 5/2252* (2013.01); *B60R 2001/1215* (2013.01); *B60R 2001/1253* (2013.01); *H04N 5/2256* (2013.01)

(58) Field of Classification Search
CPC .................................................. B60R 1/078
USPC ........................................................ 348/118
See application file for complete search history.

(56) References Cited

U.S. PATENT DOCUMENTS

| | | | | |
|---|---|---|---|---|
| 8,395,514 | B2 * | 3/2013 | Linsenmaier | B60R 1/0602 340/583 |
| 2004/0121820 | A1 * | 6/2004 | Unno | B60R 1/06 455/569.2 |
| 2007/0246967 | A1 * | 10/2007 | Lynam | B60J 5/0411 296/146.1 |
| 2009/0213480 | A1 | 8/2009 | Li | |
| 2014/0339834 | A1 * | 11/2014 | Alexander | E05C 19/022 292/96 |
| 2015/0358590 | A1 * | 12/2015 | Hottmann | H04N 7/183 348/148 |
| 2017/0210297 | A1 * | 7/2017 | Kim | B60R 1/12 |

FOREIGN PATENT DOCUMENTS

DE    102012208212 A1    11/2012

OTHER PUBLICATIONS

German Office Action dated Jan. 12, 2018 of DE 102017112915.4.

* cited by examiner

*Primary Examiner* — Yulin Sun
(74) *Attorney, Agent, or Firm* — Jones Day

(57) ABSTRACT

An exterior rearview device includes a base suited to be fixed to a vehicle, a head mounted on the base, at least one of a mirror and a display attached to the head and at least one of a camera and an illumination device attached to the base, a locking system with a locked state and an unlocked state, where the head is removable from the base in the unlocked state, and the locking system is suited to be actuated by a driver of the vehicle to switch between the locked and the unlocked state, and vice versa. A vehicle includes the at least one exterior rearview device.

12 Claims, 1 Drawing Sheet

EXTERIOR REARVIEW DEVICE WITH REMOVABLE HEAD AND VEHICLE INCLUDING SAME

CROSS-REFERENCE TO RELATED APPLICATIONS

This application claims the benefit of foreign priority to German Patent Application No. DE 10 2017 112 915.4, filed Jun. 12, 2017, which is herein incorporated by reference in its entirety for all purposes.

BACKGROUND

1. Field

The following description relates to an exterior rearview device including a base suited to be fixed to a vehicle, a head mounted on the base, a mirror and/or display device attached to the head and a camera and/or illumination device attached to the base, and a vehicle with at least one such rearview device.

2. Description of Related Art

Different functions and devices can be incorporated into and/or controlled with the help of rearview devices. Of particular interest are functions and devices to enhance, extend and/or sustain the functionality of the rearview device during normal or extreme conditions. This may include heating and/or cooling means, cleaning means such as wipers, liquid and/or gaseous sprays, actuator means for moving the rearview device or parts of it, such as for example a display, a camera system and/or parts of a camera system, having lenses, filters, light sources, adaptive optics like deformable mirrors, sensors and/or mirrors, and/or actuator means for inducing movement of other objects, for example parts of the vehicle and/or objects surrounding the vehicle. Furthermore, it can include linear tracks and/or rotating wheels, like for example a filter wheel, for exchanging optical elements, including for example lenses, mirrors, light sources, sensors, adaptive optics like deformable mirrors and/or filters.

Examples for functions and devices incorporated into and/or controlled with the help of rearview devices include illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rearview devices can include, for example, a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A camera module to be used in a rearview device can include a plurality of different optical elements, a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are, for example, described in German patent application No. 102016108247.3. Further, the camera can include, for example, CCD or CMOS or light field sensors, as described in German patent application No. 102011053999. Also, an area of the sensor can be reserved for different purposes, for example to detect a test beam, as described in U.S. Pat. No. 8,031,224. The camera module can also be equipped with apparatuses for light intensity adjustment, as described in U.S. patent application Ser. No. 14/809,509, and light level intensifier tubes, as described in U.S. patent application Ser. No. 09/771,140. Still further, the camera module or a cover adapted to the camera module can be moved using different actuators, drives and/or a flexible track, as described in German application No. 102016108247.3.

The camera module can also include cleaning elements to clean the optical element facing outwards and being exposed to the environment. The cleaning element can for example include wipers, brushes, lips, nozzles, fans and similar elements as are described in European patent application No. 14165197.6, European patent application No. 13163677.1, and European patent No. 1673260. The cleaning devices are not limited in composition, and may include any fabric, elastomeric, sponge, brush, or combination of these. Special wiper elements including wiper arms, wiper blades, wiping cloth, wiping tissue and combinations thereof are described in European patent application No. 14165197.6. A reservoir for holding a cleaning liquid is described in European patent application No. 14165197.6. Such a reservoir can be attached to or integrated into the camera module to provide the cleaning liquid to the optical elements of the camera module. Different methods may be used to detect dirt or other obscurations preventing or reducing the functioning of the camera module, such as described in U.S. Pat. No. 8,395,514, European patent No. 1328141, and U.S. Pat. No. 8,031,224. Also, light sources can be installed or integrated into the camera module to increase the visibility of surrounding objects, measure distances and directions and detect dirt, such as described in U.S. Pat. No. 8,031,224, U.S. patent application No. 62/470,658, and U.S. patent application Ser. No. 09/771,140.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0.

A watertight seal against weather effects, as well as against the influence of washing processes with detergents, solvents and high pressure cleaners can be used on the housing of the camera module, as described in U.S. patent application Ser. No. 13/090,127. In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0. Different types of fixings can be used to fix the camera module to the vehicle or other components, such as for example the snap-fit connection described in European patent No. 2233360.

Shape memory alloys (SMA) are used for various functions with rearview devices. European patent application No. 3098444 describes an actuator device for a rearview device of a motor vehicle including at least one retaining element, at least one adjusting element which can be transferred into a plurality of functional positions, in particular from a basic position into at least one end position, at least one driving means which includes at least one shape-memory element which is in the form of a wire, which extends between the retaining element and the adjusting element and can be or is secured to both, where the extension of the shape-memory element can be modified on being actuated such as being electrically energized, and by means of the modification of the extension of which the at least one adjusting element can be transferred from one functional position into another functional position, in particular from the basic position into the end position or vice versa; at least one heat-conducting means which lies in contact with the driving means at least in the end position of the adjusting element, and where at least one switching means, by means of which the at least one driving means and the at least one heat-conducting means can be or are arranged with respect to one another with no contact in the basic position of the adjusting element and/or by means of which the at least one driving means and the at least one heat-conducting means can be or are arranged touching one another at least in sections at least in the end position of the adjusting element. A further actuator for an exterior rear view mirror of a vehicle is described by European patent application No. 2781743 and has at least one actuator pin, at least one drum body enclosing a cavity, in which the actuator pin can be arranged or is arranged in a non-rotational manner, at least one clamping means which includes at least one shape-memory element which can be fixed or is fixed to the drum body and with which the drum body can be moved in a first rotational direction, and at least one return means which includes at least one shape-memory element which can be fixed or is fixed to the drum body and with which the drum body can be moved in a second rotational direction, characterized in that the clamping means and/or the return means can be fixed or are fixed on a winding portion of the drum body and in the winding portion of the drum body at least quarter of a winding, in particular at least half a winding, in particular an entire winding, in particular several windings are applied.

A conductor track can be embedded within plastic parts of the camera module as described in European patent No. 1328141 and U.S. Pat. No. 7,083,311. The camera module may include a power harvesting system, as described for example in European patent application No. 09171683.7. A fault detection system for electric consumers, as described in U.S. Pat. No. 8,487,633 can also be used with a camera module.

Different control means and analyzing devices can be used, such as the computation units described in U.S. patent application Ser. No. 13/090,127, German patent application No. 102016106126.3, German patent application No. 102011053999, European patent No. 2146325, and U.S. Pat. No. 8,849,104. In addition, HDR (high dynamical range) technology can be used according to U.S. patent application Ser. No. 14/830,406.

Rear view devices housing a camera in a base to be attached to a vehicle are known in the state of the art. For example, European Patent No. 2431225 describes an exterior mirror having a sensor accommodated in the mirror base to which a mirror head carrying a reflective element is mounted. On the other hand, a rearview device can be equipped only with different camera and/or illumination devices. It is for example known to moveably attach camera and/or illumination means to a vehicle, see e.g. in German patent application No 10 2017 109 872.0.

US patent application publication No. 2004/0121820 A1 describes an outer mirror including a mirror housing and a mirror base which suspends the mirror housing that has a mirror. Antenna unit, a monitoring camera, light sensors and plural mirrors are installed in the mirror base so that various functions are realized using this outer mirror as well as carrying out easy assembling process. An actuator to adjust the direction of a mirror and a drive unit to fold a mirror housing back to a vehicle can also be provided.

A vehicle rear mirror having a display is described in US patent application publication No. 2009/0213480 A1 and includes a seat having an insertion rod which is controlled by an electromagnetic valve; a body having a display unit; the body being slideable along the seat; the body being capable of moving outwards by an elastic force; one side of the body corresponding to the insertion rod of the seat having an insertion hole; when the body is in front of the seat; the insertion hole can receive the insertion rod so as to fix the body; when the insertion rod is released from the insertion hole, the body can be pushed outwards by elastic force; and a mirror with a mirror surface, the mirror being installed at a front side of the seat; when the body slides inwards, the body being hidden between the mirror and the seat; and when the body slides outwards, the body exposes out. The electromagnetic valve can be controlled wireless such as infrared ray remote control.

German patent application No. 10 2012 208 212 A1 describes an assembly that has a reconfigurable housing fixedly secured to a reflective surface. An actuator is drivenly coupled to the housing, so that an active material element i.e. wire, of the actuator undergoes a reversible change in fundamental property when exposed to or occluded from an activation signal e.g. pneumatic activation signal, of a controller for enabling the housing to be manipulated to cause the reflective surface to achieve specific position or reflective angle. The actuator includes a spring and a latch releasably engaged with the spring. The element is formed of an active material selected from any of shape memory alloys, ferromagnetic shape memory alloy, magnetorheological fluid, magnetorheological elastomer, electrorheological fluid, electrorheological elastomer, electroactive polymer, piezoelectric material, composite including foregoing active materials with non-active material, or combinations. The activation signal is any of a thermal activation signal, a magnetic activation signal, an electrical activation signal, a mechanical activation signal, a pneumatic activation signal, or combination.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In at least one aspect, further developing known exterior rearview devices allows for selectively making use of only a camera and/or illumination device or of a combination of the camera and/or illumination device and at least one reflective and/or display device.

A locking system includes a locked state and an unlocked state, wherein the head is removable from the base in the unlocked state, and the locking system is suited to be actuated by a driver of the vehicle to switch between the locked and the unlocked state, and vice versa, and actuating means of the locking system which is suited to be actuated manually, electrically and/or via a remote device and/or via a gesture and/or voice command.

The camera and/or illumination device may include at least one camera module, with the base preferably being provided as a camera pod. Further, the mirror and/or display device can include at least one reflective element, and/or the rearview device can communicate with at least one display element provided within the vehicle.

The head may be provided with at least one locking bolt suited to be inserted in a respective seat within the base, with the seat preferably being closeable by a lid when the head is removed from the base. The lid can flush with the outer contour of the base when closing the seat, and/or the lid can close the seat automatically upon removal of the head, and/or the lid can open the seat automatically upon changing the locking system from the locked state without head to the unlocked state.

The locking system may include at least one locking rod, in particular made out of metal, extending through a through hole provided within the least one locking bolt of the head in the locked state of the locking system when the locking bolt of the head is inserted into the base and is resting in the seat. The locking rod can be moved via a magnetic system, a motor, a SMA wire and/or a spring when changing the locking system between the locked state and the unlocked state, and vice versa. The SMA wire and/or spring can be fixed to a holding element provided within the base, with preferably the spring being made out of the SMA wire or the SMA wire being attached to the spring.

The SMA wire can be heated and/or current can be applied to the SMA wire to heat it up, with preferably the heating of the SMA wire being initiated when actuating the locking device to change from the locked state to the unlocked state.

A first guiding element may be provided between the holding element and the seat, and/or a second guiding element is provided at the side of the seat opposite the holding element, with each guiding element being provided with a through hole which is aligned with the through hole of the locking bolt, when the locking bolt rests in the seat.

The remote device may be a smart key.

A vehicle with at least one exterior rearview device may include the actuator with an element within the vehicle, in particular in form of a button.

The display element may communicate with the camera module arranged within the vehicle.

An exterior rearview device may include a camera and/or illumination device provided by a base attached to a vehicle and a removable reflective and/or display device provided by a head, which can be locked to the base. Advantageously the locking system used between the base and the head makes use of an SMA wire for an electronically controllable, strong, reliable and cost effective mechanism.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Further features, details and advantages of the invention are explained in the appended claims, in the drawings and in the description of a preferred embodiment of the head section according to the invention given below.

Figure 1:
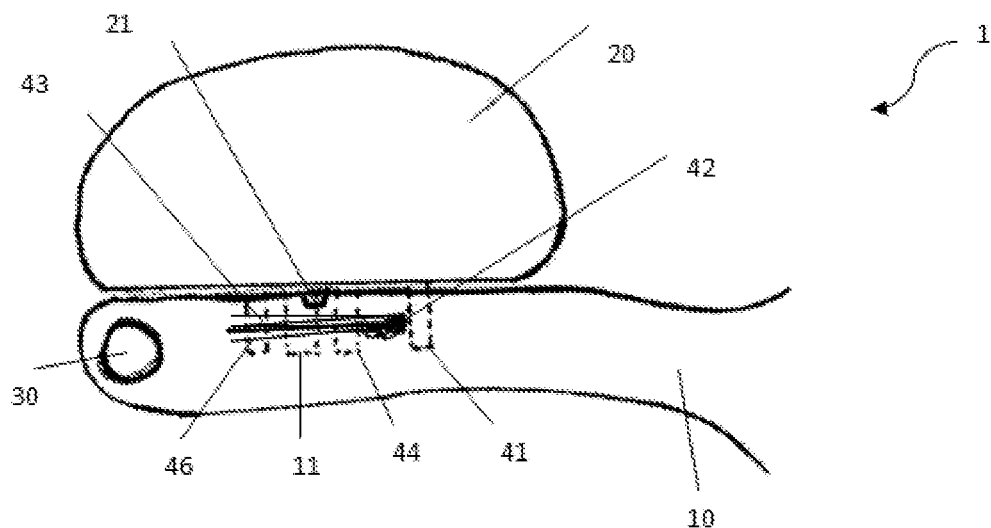
FIG. 1 is a diagram illustrating a side view of an exterior rearview device with a head locked to a base and an indication of the base longitudinal section in form of a broken lines.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rearview" is here defined as a view of the surrounding area, which is not in the field of view of the driver, i.e. the directions opposing, left, right, below and above of the viewing direction, but can also include the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 2:
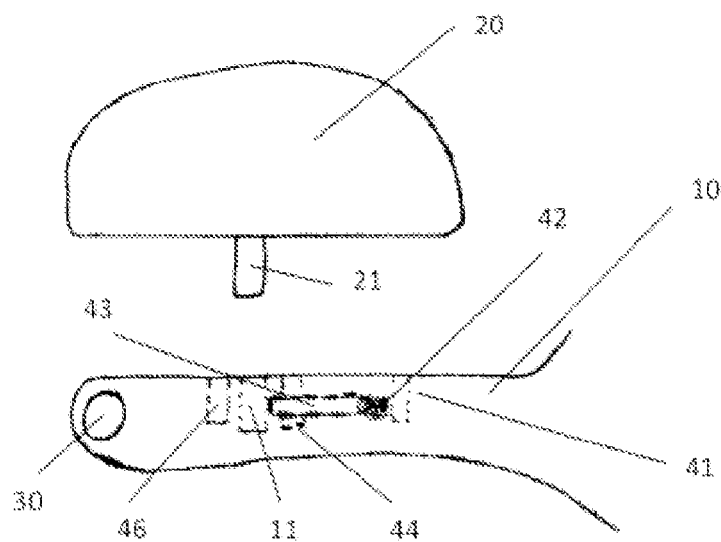
FIG. 2 is a diagram illustrating a side view of the rearview device of FIG. 1 with the head separated from the base and an indication of the base longitudinal section in broken lines.
Figure 3:
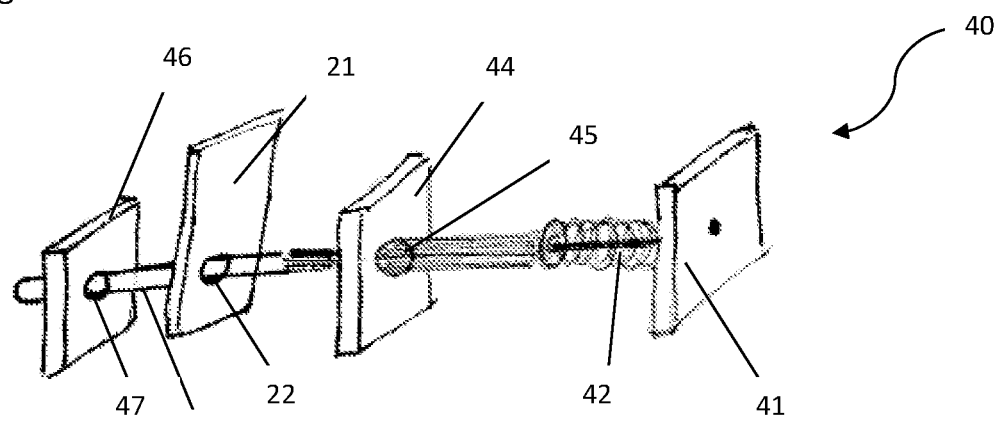
FIG. 3 is a diagram illustrating a perspective view of a locking system used with the rearview device of FIGS. 1 and 2.

FIGS. 1 to 3 show an example of a rearview device 1. The rear view device 1 includes a base 10 fixed to a vehicle, a head 20 removably mounted on the base 10 and a camera module 30 attached to the base 10. The head 20 carries a reflective element (not shown) such as a glass mirror, and can be locked to the base via a locking system 40 allowing a driver to remove the head 10 to drive only with the camera module 30 exchanging data with a display (not shown) within the vehicle. In order to remove the head 20 from the base 10 the driver can press a button (not shown) within the vehicle to open or rather unlock the locking system 40, e.g. for a couple of seconds, as described below.

The head 20 may be provided with a locking bolt 21 having a through hole 22 through which a locking rod 43 of the locking system 40, which is fixed within the base 10 via a holding element 41, extends in its locked position as shown in FIG. 1. The locking rod 43 may be attached to the holding element 41 via a spring element 42 made out of SMA wire, as can be best seen in FIG. 3. In order to guide the locking rod 43 from its unlocked position indicated in FIG. 2 into its locked position of FIG. 1, guiding elements 44, 46 are arranged on both sides of a seat 11 for the locking bolt 21. Each guiding plate 44, 46 has a through hole 45, 47 which is aligned with the through hole 22 of the locking bolt 21 when the locking bolt 21 rests in its seat 11.

To lock the head 20 on the base 10, the locking rod 23 has to be made out of a strong material like a metal in order to withstand possible forces applied to the rearview device 1 during normal use. Although only one locking bolt 1 is shown in the figures, additional bolts can be provided to stabilize the head 20 on the base 10.

To remove the locking rode 23 from its locked position and force it in is unlocked position, in principle a magnetic system, motor or the like can be use. The usage of the SMA wire spring 42 provides a cheap solution. The length of the SMA wire will shrink when heated up, which in turn will lead to a compression of the spring 42. The heating can be achieved by applying a current for a certain amount of time. During the respective time span the locking rode 23 will be in its retracted, unlocked position such that the head 20 can be removed from the base 10. As soon as the SMA wire cools down again, it will expand such that, together with the expansion/relaxation of the spring 42, the locking rode 23 is pushed back in it locked position.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGN LIST 1 rear view device
10 base
11 seat
20 head
21 locking projection
22 through hole
30 camera
40 locking system
41 holding element
42 spring element
43 locking bolt
44 guiding element
45 through hole
46 guiding element
47 through hole

What is claimed is:

1. An exterior rearview device, comprising
  a base, comprising at least one seat, at least one of a camera and an illumination device attached to the base, configured to be fixed to a vehicle;
  a head, comprising at least one locking bolt, at least one of a mirror and a display attached to the head, mounted on the base; and
  a locking system comprising an actuator,
  wherein the locking system has a locked state and an unlocked state and, in the unlocked state, the head and the at least one of the mirror and the display attached to the head is removable from the base and the at least one of the camera and illumination device attached to the base,
  the locking system is configured to be actuated by a driver of the vehicle to switch between the locked and the unlocked state, and vice versa, via the actuator of the locking system which is configured to be actuated electrically and not manually, via a remote device, via a gesture, or via a voice command, and
  the locking system comprises at least one locking rod made out of metal, extending through a through hole provided within the at least one locking bolt of the head in the locked state of the locking system when the locking bolt of the head is inserted into the base and is resting in the seat.

2. The rearview device of claim 1, wherein the at least one of the camera and the illumination device comprises at least one camera module, and the base is provided as a camera pod.

3. The rearview device of claim 1, wherein at least one of the at least one of the mirror and the display comprises at least one reflective element, and
  the rearview device is configured for communicating with the at least one display provided within the vehicle.

4. The rearview device of claim 1, wherein the at least one locking bolt is configured to be inserted in the respective seat within the base with the seat being closeable by a lid when the head is removed from the base.

5. The rearview device of claim 4, wherein at least one of the lid flushes with the outer contour of the base when closing the seat,
  the lid closes the seat automatically upon removal of the head, and the lid opens the seat automatically upon changing the locking system from the locked state without the head to the unlocked state.

6. The rearview device of claim 1, characterized in that the locking rod is moveable via at least one of a magnetic system, a motor, a Shape Memory Alloy (SMA) wire and a spring when changing the locking system between the locked state and the unlocked state, and vice versa.

7. The rearview device of claim 6, wherein at least one of the SMA wire and spring is fixed to a holding element provided within the base with the spring being made out of the SMA wire or the SMA wire being attached to the spring.

8. The rearview device of claim 7, wherein at least one of the SMA wire can be heated, and current can be applied to the SMA wire to heat it up with the heating of the SMA wire being initiated, when actuating the locking device to change from the locked state to the unlocked state.

9. The rearview device of claim 6, further comprising at least one of
   a first guiding element provided between the holding element and the seat; and
   a second guiding element provided at a side of the seat opposite the holding element,
   wherein each guiding element is provided with a through hole which is aligned with the through hole of the locking bolt when the locking bolt rests in the seat.

10. The rearview device of claim 1, wherein the remote device is a smart key.

11. A vehicle with at least one exterior rearview device as recited in claim 10, wherein the actuator comprises an element within the vehicle in form of a button.

12. The vehicle of claim 11, wherein the display communicating with the camera module is arranged within the vehicle.

* * * * *